United States Patent [19]
Burton

[11] 3,758,147
[45] Sept. 11, 1973

[54] MOBILE UNIT WITH OVERHEAD COMPARTMENT

[76] Inventor: Maurice G. Burton, 1958 E. 70th South, Salt Lake City, Utah

[22] Filed: Nov. 30, 1971

[21] Appl. No.: 203,141

[52] U.S. Cl............................ 296/23 R, 296/23 MC
[51] Int. Cl............................................... B60p 3/38
[58] Field of Search......................... 296/23, 23 MC

[56] References Cited
UNITED STATES PATENTS
3,508,781  4/1970  Anderson ..................... 296/23 MC
3,475,048  10/1969  McNamee ........................ 296/23 R Primary Examiner—Philip Goodman
Attorney—Lawrence J. Winter

[57] ABSTRACT

A mobile home unit having an overhead compartment therein including a hump portion disposed above the driver's cab with a foldable bed means therein forming the bottom of the compartment and having a streamline nosepiece member forming the front end of the compartment.

6 Claims, 5 Drawing Figures

MOBILE UNIT WITH OVERHEAD COMPARTMENT

The present invention relates to a mobile home and more particularly to one that is self contained as an integral unit as distinguished from the conventional trailer type or the detachable type of vehicle motor unit.

It is an object of the present invention to provide a mobile home that is provided with an upper compartment disposed above the cab or driver compartment so as to give additional sleeping space therein.

It is another object of the present invention to provide an enlarged overhead bed compartment which extends above the remaining top of the vehicle and which is provided with a nosepiece having a sloping front surface which provides stabilizing aerodynamic effect of a downward force and allows smooth air flow with a minimum of turbulence.

It is another object of the present invention to provide an overhead bed compartment having a foldable bed therein in which a portion of the bed board folds into a vertical position for more headroom when desired, and when it is not being used for a sleeping compartment.

Various other objects and advantages of the present invention will be readily apparent from the following detailed description when considered in connection with the accompanying drawings forming a partner of and in which.

Figure 1:
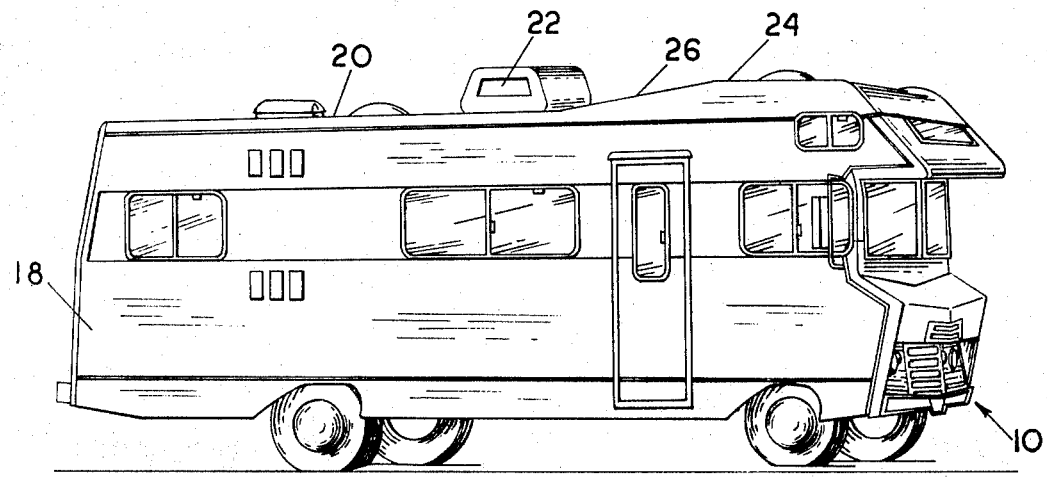
FIG. 1 is a perspective view illustrating the mobile home embodied in the present invention.

Referring to the drawings reference numeral 10 generally designates a mobile unit having propulsion means therein and in which the entire unit is a motor home, and is not of the conventional trailer type, or type of vehicle in which the home is detachably positioned within the frame of a truck.

The motor home is provided with a driving compartment or cab 12 with a steering wheel 24 therein and a driver seat 16.

Figure 2:
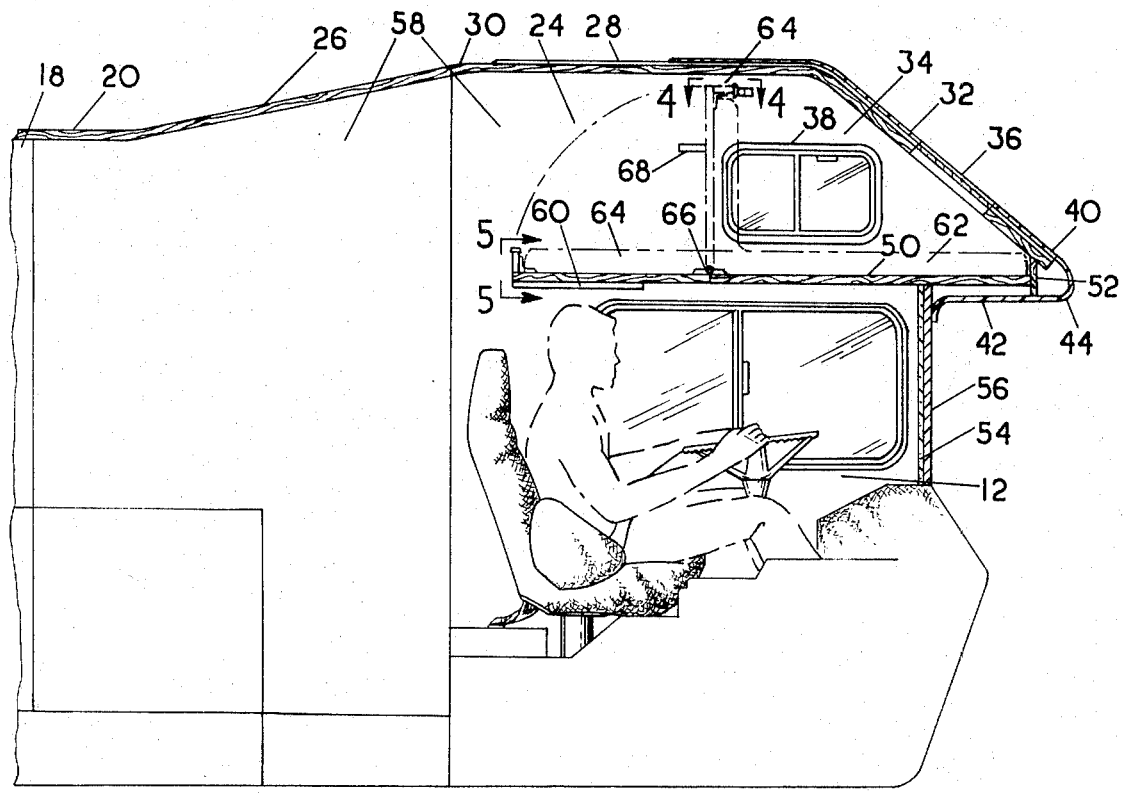
FIG. 2 is an enlarged detailed view in section and illustrating the front end of the mobile home and the overhead bed compartment.
Figure 3:
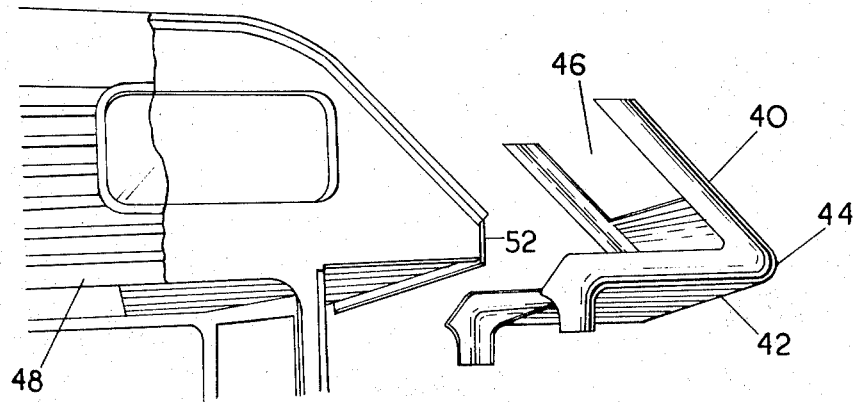
FIG. 3 is an exploded perspective view illustrating the nosepiece ready to be assembled in place in the overhead bed compartment.

As best seen in FIGS. 1 and 2, the rear portion of the motor home indicated at 18 has a substantially horizontally extending roof or top 20 in which are disposed the usual ventilating means generally designated as 22. Adjacent the front end of the vehicle and disposed over the cab 12 is an overhead bed compartment 24. This bed compartment is provided with an upwardly extending rear portion 26 which terminates in a substantially horizontally extending portion 28 adjacent its upper edge 30. The leading or front edge of the portion 28 terminates in a downwardly and forwardly extending portion 32. Portion 32 extends at an approximately 45 degree angle with respect to a horizontal plane and extends substantially below the portion 26 so as to form a bedspace 34 therein of sufficient depth for someone to sleep therein and to have sufficient headroom. The compartment 24 is provided with a front sloping window 36 in portion 32, and side windows 38. The portion 32 is also provided with a fiber glass nosepiece indicated at 40, having a solid bottom 42 and rounded tip 44 with a space 46 therein for insertion of the glass front window 36. The nosepiece 40 is assembled in place after the outer paneling indicated at 48 in FIG. 3 is disposed in place.

Referring to FIG. 2 the bed platform 50 has its front edge secured to a vertical brace 52 in turn secured to the forwardly extending portion 32. The windshield 54 is disposed between the vertical supports 56 which have their upper edges supporting the bed platform 50.

Figure 5:
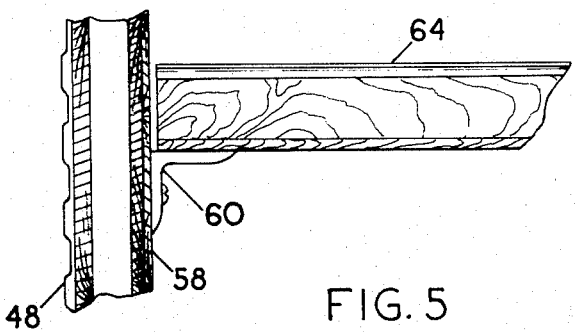
FIG. 5 is an enlarged detailed view taken along the lines 5—5 of FIG. 2 illustrating the support means for maintaining the bedboard of the present invention disposed in a horizontal position.

The sidewalls 58 of the motor home are provided with angle irons 60 extending longitudinally of the walls 58, as best seen in FIGS. 2 and 5. The bed platform 50 comprises a front stationary portion 62 and a rear movable portion 64 which are hinged together at 66 and when the bed is in a usable position, as seen in FIGS. 2 and 5 the rear edge of the movable portion 64 is supported on the angle iron 60.

Figure 4:
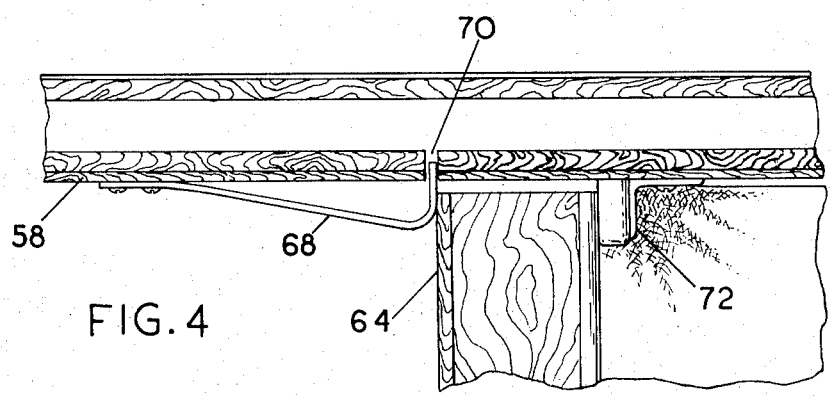
FIG. 4 is an enlarged fragmentary detailed view taken along the lines 4—4 of FIG. 2 illustrating means for maintaining the pivotal portion of the overhead bed board disposed in a vertical position.

When it is desired to fold the bed away when it is not in use the rear portion 64 is moved from its horizontal position, as seen in FIG. 2 to the dotted position illustrated in FIG. 2 at which time it is in a vertical position. Referring to FIG. 4, a resilient latch member 68 is mounted on side walls 58 in a horizontal position have its front end extending into a vertical slot 70 in the side walls so that when the bed portion 64 is moved into its vertical position, the latch member 68 will permit the bed portion 64 to slip entirely past the latch member into vertical position. The latch will resume its position as shown in FIG. 4 to maintain the bed portion 64 in vertical position. Spaced forward of the slot 70 is mounted on the side wall 58 a stop 72 which is a rubber pad attached to an angle iron, to prevent the bed portion 64 from moving forward of a vertical position.

Thus, from the foregoing description it is apparent that the present invention provides a novel invention in which a mobile home is provided with a raised or humped compartment adjacent and above the driver's cab for providing additional sleeping therein.

From the foregoing description, it is further apparent that the present invention provides a novel overhead bed compartment above the cab portion of the vehicle in which bed means are provided with a movable rear portion thereof so that the bed may be folded upwardly into a closed position when not in use so as to give more space in the mobile home.

From the foregoing description it is further apparent that the present invention provides a novel overhead bed compartment having a fiber glass nosepiece member disposed therein of a sloping configuration so that its front surface provides a stabilizing aerodynamic effect of a downward force and allows smooth air flow with a minimum amount of turbulence when the mobile home is under way.

Inasmuch as various changes may be made in the relative arrangement, form and location of the parts without departing from the invention, it is not meant to limit the scope of the invention except by the appended claims.

What is claimed is:

1. A mobile home with a horizontally extending roof, a cab section for operating the home, a bed compartment over said cab section including a foldable bed platform therein, said compartment including a raised section extending above the remaining roof section of the home, said compartment having an upwardly sloping rear portion, a horizontal middle portion and a downwardly extending front portion, said front portion having a fiber glass nose piece consisting of a front bifurcated wall, and a bottom horizontal portion with a rounded front tip with said nosepiece front portion being disposed at approximately a 45° angle with a horizontal plane, and said bed platform comprising a front immovable section and a rear folding section.

2. The mobile home of claim 1 wherein said bed sections are hinged together.

3. The mobile home of claim 2 wherein support means are secured to the walls of the home adjacent the rear end of the rear section of the bed platform to support it in a horizontal position.

4. The mobile home of claim 3 wherein the side walls of the mobile home have resilient spring latch means therein for permitting said rear bed section to depress them when moved to a vertical position and thereafter lock it in a vertical position.

5. The mobile home of claim 4 wherein stop means are disposed on said wall means forward of said latch means to hold said rear bed section in a vertical position.

6. A mobile home with a horizontally extending roof, a cab section for operating the home, a bed compartment over said cab section including a foldable bed platform therein said compartment including a raised section extending above the remaining roof section of the home, with an upwardly sloping rear portion, a horizontal middle portion and a downwardly extending front portion, said bed platform comprising a front immovable section and a folding rear section.

* * * * *